(No Model.)

J. J. JOHNSTON.
Heater for Churches.

No. 236,891. Patented Jan. 25, 1881.

WITNESSES

INVENTOR
James J. Johnston

UNITED STATES PATENT OFFICE.

JAMES J. JOHNSTON, OF COLUMBIANA, OHIO, ASSIGNOR TO HIMSELF AND
A. C. ELLIS, OF ALLEGHENY, PENNSYLVANIA.

HEATER FOR CHURCHES.

SPECIFICATION forming part of Letters Patent No. 236,891, dated January 25, 1881.

Application filed April 12, 1880. (No model.)

*To all whom it may concern:*

Be it known that I, JAMES J. JOHNSTON, of Columbiana, in the county of Columbiana and State of Ohio, have invented a new and useful Improvement in Heaters for Churches, Offices, School-Houses, and Dwellings, the said improvement being an improvement upon the heating apparatus for which Letters Patent were granted to me March 24, 1874, and numbered 148,831; and I do hereby declare that the following is a full, clear, and exact description of my present invention, reference being had to the accompanying drawings and to the letters of reference marked thereon.

My present invention consists in the peculiar construction and arrangement of the several parts of the heater hereinafter described.

To enable others skilled in the art with which my invention is most nearly connected to make and use it, I will proceed to describe its construction and operation.

Figure 1:
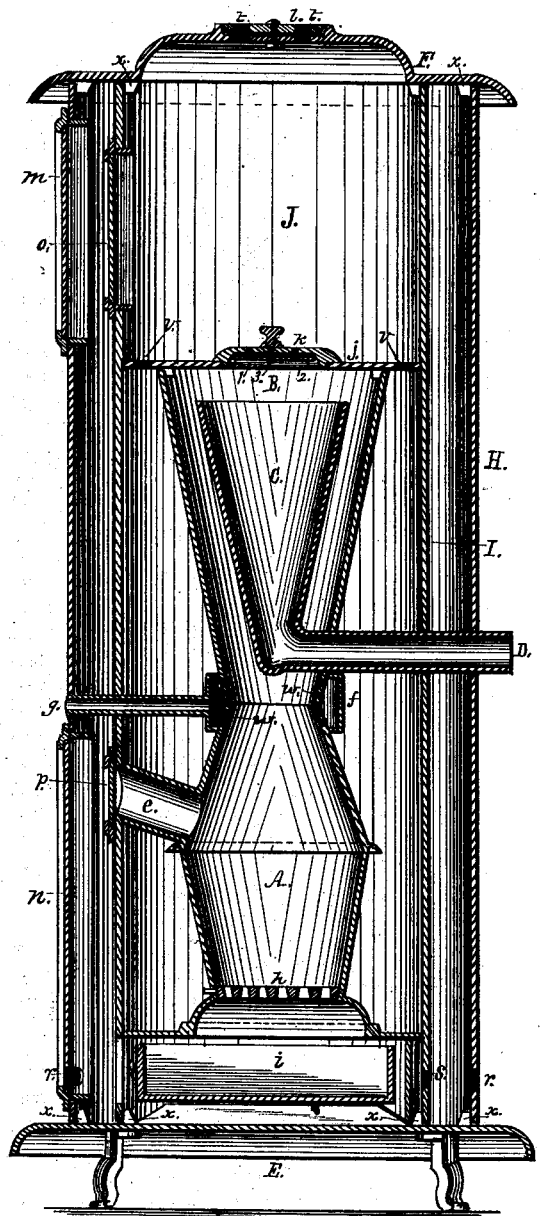
Figure 2:
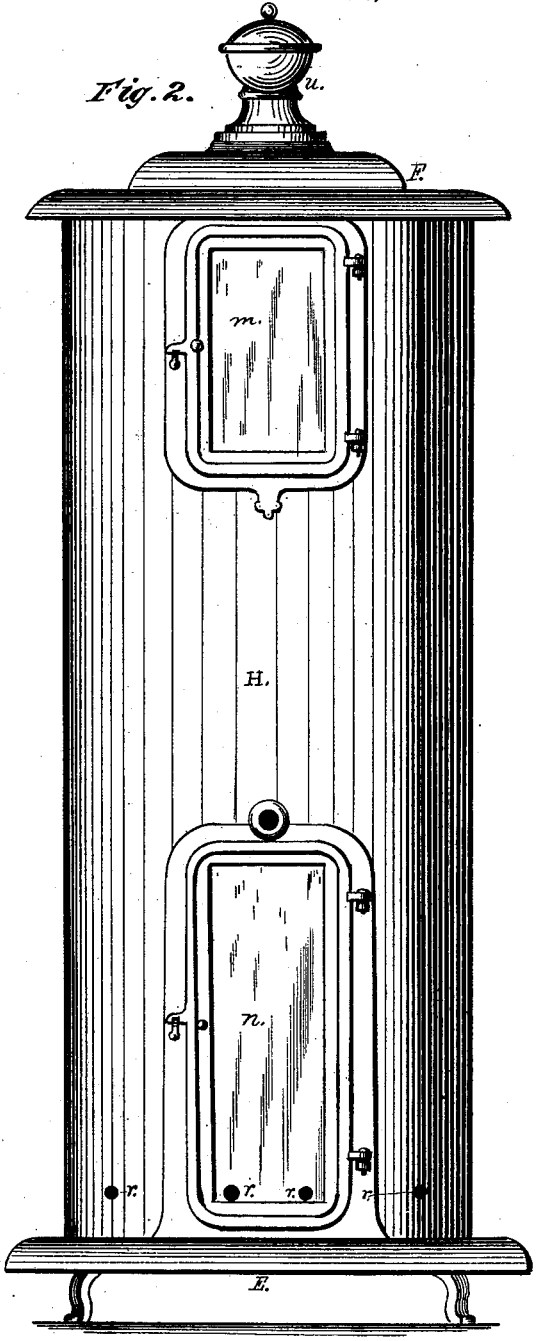

In the accompanying drawings, which form part of my specification, Figure 1 is a vertical section of my improvement in heaters for churches, offices, school-houses, and dwellings, and Fig. 2 is a front elevation of the same.

In the accompanying drawings, A represents the fire-chamber, which is constructed of cast-iron, and is provided with a grate, $h$, ash chamber and pan, $i$, and feed-chute, $e$, furnished with a door, $p$, all of which is supported upon a bottom, E, and resembles an ordinary heating-stove. On the upper part of the fire-chamber A is placed a part, B, in the form of a hollow inverted cone, which communicates with the fire-chamber A. On the upper end of the part B is placed a plate, $j$, having an opening in its center closed with a removable lid, $k$. Within the part B is a part, C, similar in form to the part B. To the lower end of the part C is connected a flue, D, which passes out through the two casings I and H. At the junction of the part B with upper part of the fire-chamber A is a chamber, $f$, which surrounds said parts at their point of union with each other, at which point said parts are furnished with a large number of very small perforations, $w$. Through the casings H and I passes a tube, $g$, which communicates with the chamber $f$, and is used for the purpose of conveying air into said chamber $f$. The fire-chamber A and the part B are inclosed by the casing I, which is divided into two compartments by the plate $j$, which compartments communicate with each other through the medium of a series of openings, $v$. The casing I is inclosed by a casing, H, leaving a space between said casings. The casing I is furnished with a series of openings, $s$, near its lower end, for admitting air to and around the fire-chamber A. The compartment J, formed by the casing I, plate $j$, and top E, is furnished with a door, $o$, and the outer casing, H, is furnished with two doors, $m$ and $n$. The door $m$ is for entrance to the compartment J, and the door $n$ for supplying the fire-chamber A with fuel, and for removing the ash-pan $i$ when necessary to do so. The casings H and I are held in proper relation to each other and to the fire-chamber A by means of flanges $x$ on the bottom E and top F. The top F is furnished with a register, $l$, having openings $t$, which may be opened and closed at the will of the operator. The removable lid $k$ is provided with a register, 1, and a guard-plate, 2, with an opening, 3, in its center.

The top F may have on it any desired ornamental piece, as indicated by an urn, $u$, in Fig. 2.

As the construction and arrangement of the several parts of my improved heater will be readily understood from the foregoing description and reference to the accompanying drawings, I will proceed to describe its operation, which is as follows: A fire being made in the chamber A, and it supplied with sufficient fuel, the door $n$ is closed, and the heat generated by the fire will so rarefy the air around the fire-chamber A that it will pass up through the openings $v$ into the compartment J, and from it, through the openings $t$, into the upper part of the room in which the heater is placed, and fresh air will enter the openings $r$ in the case H, into the space between the casings H and I, and from said space will pass through openings $s$ to and around the fire-chamber A, where it will become heated and pass up into the compartment J, and from it will pass out through openings $t$ into the upper part of the room, and will thus continue to operate until the air is revolved over and over until any desired temperature is obtained, which will be uniform in all parts of the room in which the heater is placed.

The operation of the fire-chamber A is as follows: Fire being made in the chamber A, the smoke and heat pass up between the inner wall of the part B and outer wall of the part C, and are drawn by the draft of flue D into the part C, and passing down through it into the flue D are carried off by the flue in the chimney of the building; but the smoke and heat in their ascent, in passing the apertures $w$, become charged with air from the chamber $f$, and the commingled smoke, heat, and air, striking against the outward-inclined wall of the part C, cause a reaction of the commingled gases, which, in their eddying movements, become highly heated, and are ignited and consumed, or nearly so, causing an intense heat, which, acting on the inner walls of the chamber A and part B, rapidly rarefies the air admitted to and around said chamber and part, which rarefied air passes out into the room in the manner hereinbefore described.

The compartment J may be used for baking, drying, or for any other purpose that the oven of the ordinary cooking-stove or kitchen-range can be employed for, with many advantages over said oven.

If the room in which the heater is placed becomes too warm the operator closes the register $l$ and opens the register 1 in lid $k$, thereby causing the heated air to pass down through the register 1, and through opening 3 of the guard-plate 2 into the part C, from which it is carried off through the flue D.

The guard-plate 2 is used for the purpose of preventing smoke, gas, or dust from passing up through the register 1 when it is opened for carrying off the heated air.

The removable lid $k$ is used for the purpose of affording ingress to the part C for cleaning out said part and the flue D when said part and flue become charged with dust and other refuse of combustion.

The advantage of my improvement in heaters for churches, offices, &c., consists in generating heat with economy of fuel, uniformity of heat in all parts of the room in which it is placed, cleanliness and ease of manipulation, and the advantage that persons seated near to the heater will not be annoyed nor suffer from reflected heat common to stoves in churches, offices, and other places.

Having thus described my invention, what I claim is—

1. In the heater hereinbefore described, the fire-chamber A and the parts B and C, in combination with the air-chamber $f$, inlet-tube $g$, and surrounding casings I and H, having air-inlet openings $r$ and $s$, substantially as and for the purpose specified.

2. In the hereinbefore-described heater, the fire-chamber A and the parts B and C, in combination with the casing I, forming a chamber divided into two compartments communicating with each other and surrounded with casing H, substantially as herein described, and for the purpose set forth.

3. In the hereinbefore-described heater, the chamber A and the parts B and C, in combination with the casings I H, division-plate $j$, and registers $l$ 1, arranged, respectively, in top of furnace and said division-plate, substantially as herein described, and for the purpose set forth.

4. In the hereinbefore-described heater, the chamber A and the parts B and C, in combination with the casings I H, plate $j$, and lid $k$, having register 1, substantially as herein described, and for the purpose set forth.

JAMES J. JOHNSTON.

Witnesses:
FRED. G. DIETERICH,
P. C. DIETERICH.